US010202842B2

(12) United States Patent
Kyle et al.

(10) Patent No.: US 10,202,842 B2
(45) Date of Patent: Feb. 12, 2019

(54) DISTRIBUTED SCINTILLATION DETECTOR FOR DOWNHOLE POSITIONING

(71) Applicant: Halliburton Energy Services, Inc., Houston, TX (US)

(72) Inventors: Donald Kyle, Plano, TX (US); Neal G. Skinner, Lewisville, TX (US); Paul D. Ringgenberg, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/564,077

(22) PCT Filed: May 15, 2015

(86) PCT No.: PCT/US2015/031161
§ 371 (c)(1),
(2) Date: Oct. 3, 2017

(87) PCT Pub. No.: WO2016/186623
PCT Pub. Date: Nov. 24, 2016

(65) Prior Publication Data
US 2018/0135407 A1    May 17, 2018

(51) Int. Cl.
*G01V 5/00* (2006.01)
*E21B 47/09* (2012.01)
(Continued)

(52) U.S. Cl.
CPC ............... *E21B 47/09* (2013.01); *G01V 5/04* (2013.01); *G01V 5/06* (2013.01); *G01V 5/08* (2013.01); *G01V 5/107* (2013.01)

(58) Field of Classification Search
CPC . G01V 5/04; G01V 5/06; G01V 5/107; G01V 5/08; E21B 47/09
See application file for complete search history.

(56) References Cited

U.S. PATENT DOCUMENTS

| 5,298,756 A * | 3/1994 | McCollum ............... G01T 3/06 250/390.07 |
| 2004/0116807 A1* | 6/2004 | Amrami ................... A61B 6/00 600/436 |

(Continued)

FOREIGN PATENT DOCUMENTS

WO    WO 2014/131132 A1    9/2014

OTHER PUBLICATIONS

International Search Report and the Written Opinion of the International Search Authority, or the Declaration, dated Feb. 1, 2016, PCT/US2015/031161, 20 pages, ISA/KR.

*Primary Examiner* — Kiho Kim
(74) *Attorney, Agent, or Firm* — Haynes and Boone, LLP

(57) ABSTRACT

A position determination system and a method for position detection within a wellbore are disclosed. A radioactive tag may be disposed within the wellbore. One or more scintillating optical fibers may be longitudinally disposed along a drill string, wireline, or the like, and run into the wellbore. A detector system is coupled to the optical fiber(s). A scintillating optical fiber emits short, bright flashes of visible light whenever exposed to the gamma radiation. When a scintillating flash is measured, it may be determined that the optical fiber is located within proximity to the radioactive tag. The amplitude of received pulses may be used to estimate where in the optical fiber scintillating events are occurring. By providing a second optical fiber coupled to a scintillating optical fiber, a time delay between received pulses may be used to indicate where along the scintillating optical fiber scintillation events are occurring.

18 Claims, 9 Drawing Sheets

(51) Int. Cl.
*G01V 5/06* (2006.01)
*G01V 5/04* (2006.01)
*G01V 5/10* (2006.01)
*G01V 5/08* (2006.01)

(56) References Cited

U.S. PATENT DOCUMENTS

| | | |
|---|---|---|
| 2008/0105423 A1* | 5/2008 | Estes ................ E21B 47/04 166/250.01 |
| 2009/0120637 A1 | 5/2009 | Kirkwood et al. |
| 2009/0188665 A1 | 7/2009 | Tubel et al. |
| 2011/0035151 A1 | 2/2011 | Botto |
| 2014/0103227 A1 | 4/2014 | Menge |
| 2016/0017704 A1* | 1/2016 | Camwell ............ E21B 47/09 250/257 |

* cited by examiner

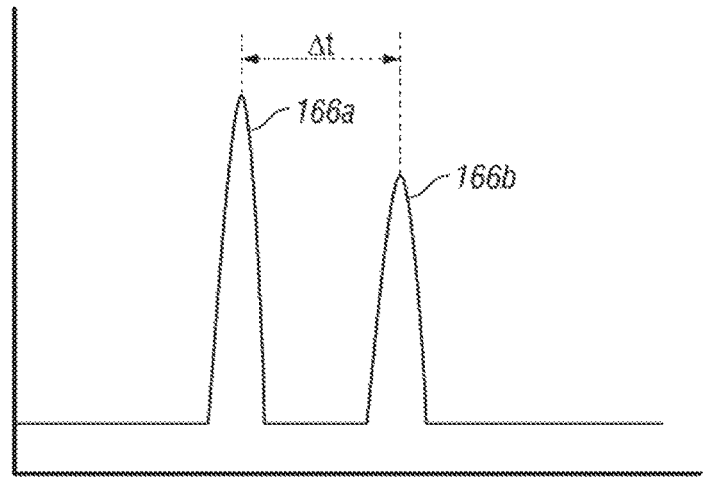
FIG. 9
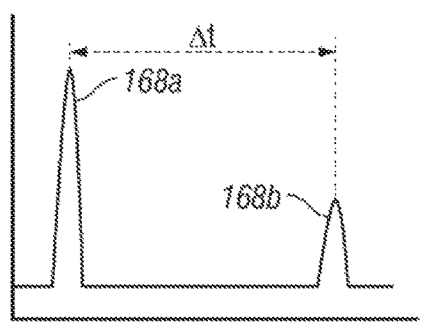 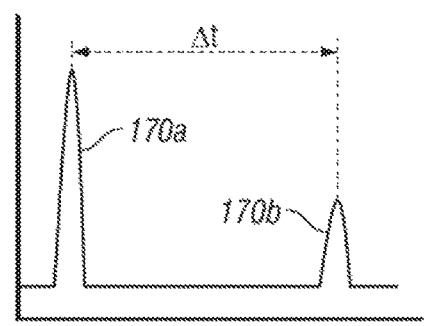
FIG. 10A  FIG. 10B

DISTRIBUTED SCINTILLATION DETECTOR FOR DOWNHOLE POSITIONING

PRIORITY

The present application is a U.S. National Stage patent application of International Patent Application No. PCT/US2015/031161, filed on May 15, 2015, the benefit of which is claimed and the disclosure of which is incorporated herein by reference in its entirety.

TECHNICAL FIELD

The present disclosure relates generally to oilfield equipment, and in particular to downhole tools, drilling, completion, and workover systems and the like, and techniques for drilling and servicing wellbores in the earth. More particularly still, the present disclosure relates to determining the position of a downhole tool or conveyance within a wellbore.

BACKGROUND

The need to accurately determine the position of tubing, drill string, wireline, or other conveyance within a wellbore is essential to many downhole services. Conventionally, wireline correlation surveys using a gamma ray and collar locating tools are conducted to determine a position within a wellbore.

BRIEF DESCRIPTION OF THE DRAWINGS

Embodiments are described in detail hereinafter with reference to the accompanying figures, in which:

FIG. 9 is a graph of scintillation responses to a single scintillation event measured by the first detector of the system of FIG. 7;

FIGS. 10A and 10B are graphs of scintillation responses to a single scintillation event measured by the first and second optical detectors, respectively, of the system of FIG. 8.

DETAILED DESCRIPTION

Figure 1:
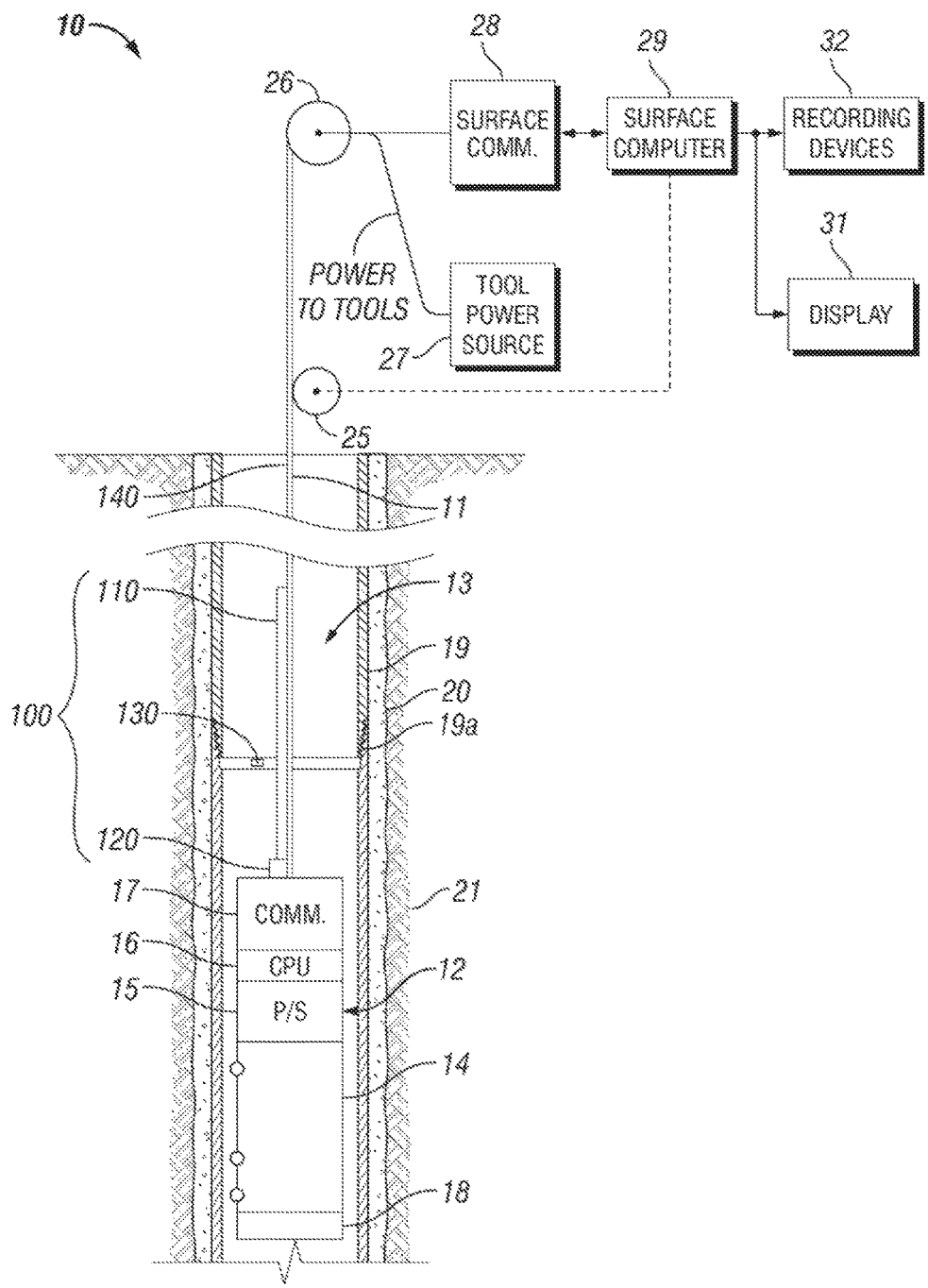
FIG. 1 is a block-level schematic diagram of an exemplary wireline system, showing a wireline tool suspended by wireline and a position determination system according to an embodiment.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

The need to accurately determine the position of tubing, drill string, wireline, or other conveyance within a wellbore is essential to many downhole services. The present disclosure describes a system and method to quickly determine the position of a conveyance with respect to to a radioactive tag disposed within a wellbore casing or liner, for example. Position information may be telemetered to the surface in real time, stored for later verification, or used to automatically activate one or more downhole tools when at a proper location within the wellbore.

FIG. 1 shows a system view of a wireline system 10 according to one or more embodiments. A conveyance, such as wireline cable 11, suspends a wireline tool 12 in a wellbore 13. Wellbore 13 may be lined with casing 19 and a cement sheath 20, or wellbore 13 may be open hole (not illustrated). Wellbore 13 can be any depth, and the length of wireline cable 11 should be sufficient for the depth of wellbore 13. Wireline system 10 may include a sheave 25 which may be used in guiding the wireline cable 11 into wellbore 13. Wireline cable 11 may be spooled on a cable reel 26 or drum for storage. Wireline cable 11 may be structurally connected with wireline tool 12 and payed out or taken in to raise and lower wireline tool 12 in wellbore 13.

Wireline tool 12 may have a protective shell or housing which may be fluid tight and pressure resistant to enable the equipment within the interior to be supported and protected during deployment. Wireline tool 12 may enclose one or more logging tools which generate data useful in analysis of wellbore 13 or in determining the nature of the formation 21 in which wellbore 13 is located. However, other types of tools, including fishing tools, coring tools, and testing tools may be used.

Wireline tool 12 may also enclose a power supply 15 and a computer or processor system 16. Output data streams of one or more detectors may be provided to a communications module 17 having an uplink communication device, a downlink communication device, a data transmitter, and a data receiver, for example.

One or more electrical wires in wireline cable 11 may be connected with surface-located equipment, which may include a power source 27 to provide power to tool power supply 15, a surface communication module 28 having an uplink communication device, a downlink communication device, a data transmitter and also a data receiver, a surface computer 29, a display 31, and one or more recording devices 32. Sheave 25 may be connected by a suitable sensor to an input of surface computer 29 to provide depth measuring information.

According to one or more embodiments, a position determination system 100 may be provided with wireline system 10. Position determination system 100 may include a scintillating optical fiber 110 coupled to a detector system 120. Scintillating optical fiber 110 may be located within wireline cable 11 or carried along an exterior portion of wireline cable 11, for example. Similarly, detector system 120 may be may located within wireline tool 12 or carried along an exterior portion of wireline cable 11. Position determination system 100 may also include a radioactive tag 130, which may be located on or within casing 19, a liner (not illustrated), cement sheath 20, or elsewhere within wellbore 13. FIG. 1 illustrates radioactive tag 130 being located within a casing joint 19a. As described in greater detail hereinafter with respect to FIGS. 3-8, detector system 120 may be operable to determine when scintillating optical fiber 110 is proximal to radioactive tag 130.

Figure 2:
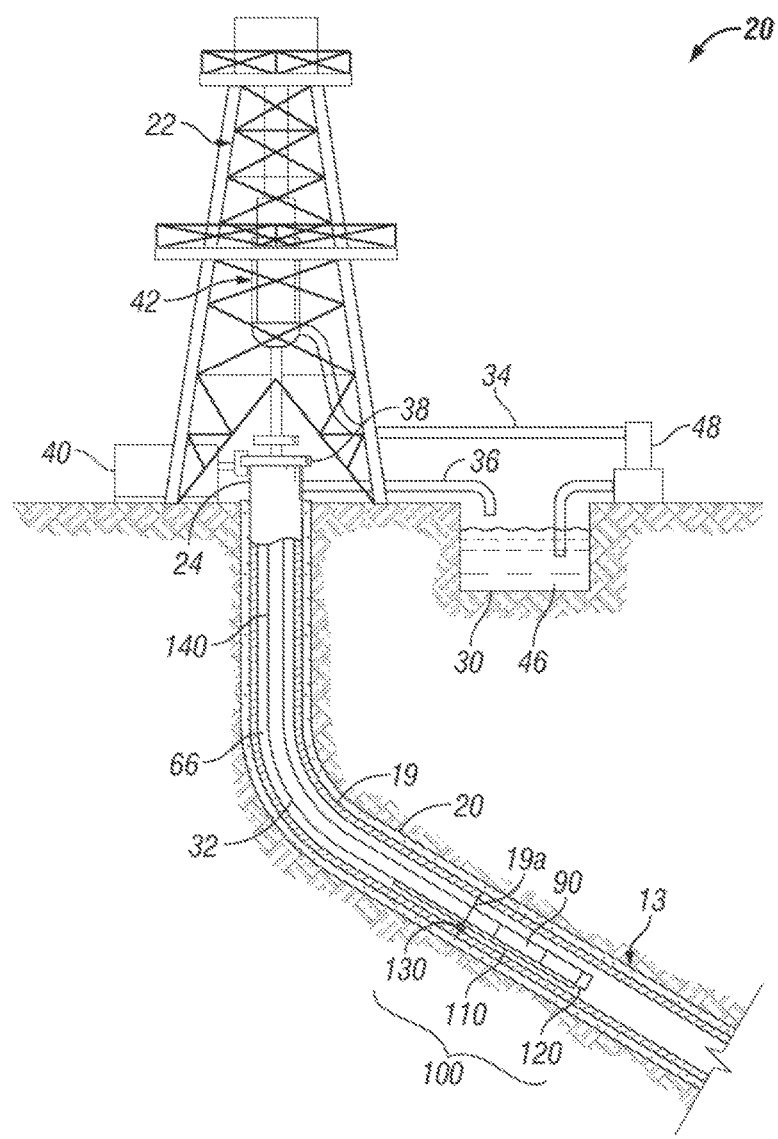
FIG. 2 is a block-level schematic diagram of an exemplary drilling, completion, workover system or the like, showing a rig carrying a string and a downhole tool and a position determination system according to an embodiment.

FIG. 2 illustrates a system view of a drilling, completion, workover system 20 or the like according to one or more embodiments. System 20 may include a derrick or rig 22, which may be located on land, as illustrated, or atop an offshore platform, semi-submersible, drill ship, or any other suitable platform. Rig 22 may carry a string 32, which may be a drill string or other tubular conveyance, for example. Rig 22 may be located proximate well head 24. Rig 22 may also include rotary table 38, rotary drive motor 40 and other equipment associated with rotation of drill string 32 within wellbore 13. For some applications rig 22 may include top drive motor or top drive unit 42. Blow out preventers (not expressly shown) and other equipment associated with drilling a wellbore 13 may also be provided at well head 24.

One or more pumps 48 may be used to pump drilling fluid 46 from fluid reservoir or pit 30 via conduit 34 to the uphole end of drill string 32 extending from well head 24. Annulus 66 is formed between the exterior of drill string 32 and the inside diameter of wellbore 13. The downhole end of drill string 32 may carry one or more downhole tools 90, which may include a bottom hole assembly, mud motor, drill bit, perforating gun, fishing tool, sampler, sub, stabilizer, drill collar, tractor, telemetry device, logging device, or any other suitable tool(s). Drilling fluid 46 may flow through a longitudinal bore (not expressly shown) of drill string 32 and exit into wellbore annulus 66 via one or more ports. Conduit 36 may be used to return drilling fluid, reservoir fluids, formation cuttings and/or downhole debris from wellbore annulus 66 to fluid reservoir or pit 30. Various types of screens, filters and/or centrifuges (not expressly shown) may be provided to remove formation cuttings and other downhole debris prior to returning drilling fluid to pit 30.

According to one or more embodiments, position determination system 100 may be provided with drilling, completion, or workover system 20. Position determination system 100 may include a scintillating optical fiber 110 coupled to a detector system 120. Scintillating optical fiber 110 may be carried along an exterior or an interior portion of string 32, for example. Scintillating optical fiber 110 may be strapped or otherwise temporarily or permanently affixed to string 32. Similarly, detector system 120 may be may located within downhole tool 90 or carried along an exterior or an interior portion of string 32. Position determination system 100 may also include a radioactive tag 130, which may be located on or within casing 19, a liner (not illustrated), cement sheath 20, or elsewhere within wellbore 13. FIG. 2 illustrates radioactive tag 130 being located within a casing joint 19a. As described in greater detail hereinafter with respect to FIGS. 3-8, detector system 120 may be operable to determine when scintillating optical fiber 110 is proximal to radioactive tag 130.

FIGS. 3A-3D are simplified axial cross sections of wellbore 13 lined with casing 19. A conveyance 140 is disposed within wellbore 13. Conveyance 140 may be a wireline, coiled tubing, drill pipe, or the like. Position determination system 100 may be provided. According to one or more embodiments, position determination system 100 may include a scintillating first optical fiber 110. Scintillating optical fiber 110 may be carried along conveyance 140. The length of first optical fiber 110 may range from 10-30 meters, although any suitable length may be used. Scintillating first optical fiber 110 has a first end coupled to a first optical detector 122 of detector system 120. Optical detector 122 may be a photomultiplier, photodiode, or other suitable device. The second end of first optical fiber 110 may be dead-ended. Position determination system 100 may also include a radioactive tag 130, which may be located on or within casing 19, a liner, cement sheath (not illustrated), or elsewhere within wellbore 13. Radioactive tag 130 may be purposely and precisely located at a particular reference depth in wellbore 13. Radioactive tag 130 may include any suitable radioisotope, such as $^{60}Co$ or $^{138}Cs$.

Scintillating optical fiber may include materials that emit short, bright flashes of visible light whenever exposed to the gamma radiation emitted by radioactive tag 130. Scintillating first optical fiber 110 may include a plastic optical fiber, such as a polymethylmethacrylate- or fluorinated polymer-cladded polystyrene core. Such scintillating optical fibers may be characterized by high optical losses that may provide an amplitude versus length characteristic which may be used to determine where radioactive tag 130 is located in relationship to the first optical fiber 110. Alternatively, scintillating first optical fiber 110 may include a higher-temperature-rated lossy optic fiber, such as a silica- or sapphire-based fiber, encased in tubing and immersed in a scintillating fluid. Interaction between the scintillating fluid and ionizing radiation emitted by radioactive tag 130 generates short, bright flashes of light, a portion of which may be optically coupled into the fiber 110.

Figure 3A:
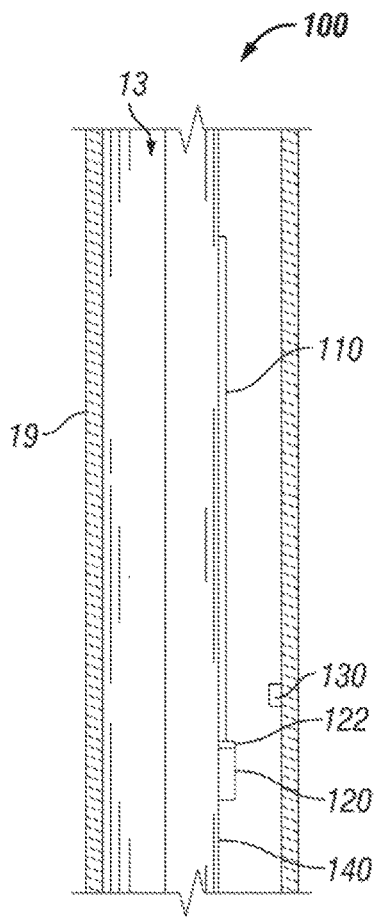
FIGS. 3A-3D are simplified axial cross sections of a position determination system according to an embodiment, showing a radioactive tag disposed within a wellbore, and a scintillating optical fiber and an optical detector carried along a conveyance being run within the wellbore past the radioactive tag.
Figure 3B:
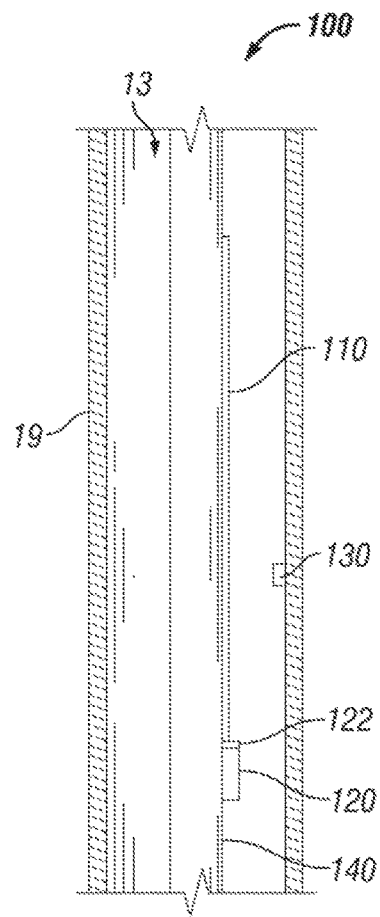
Figure 3C:
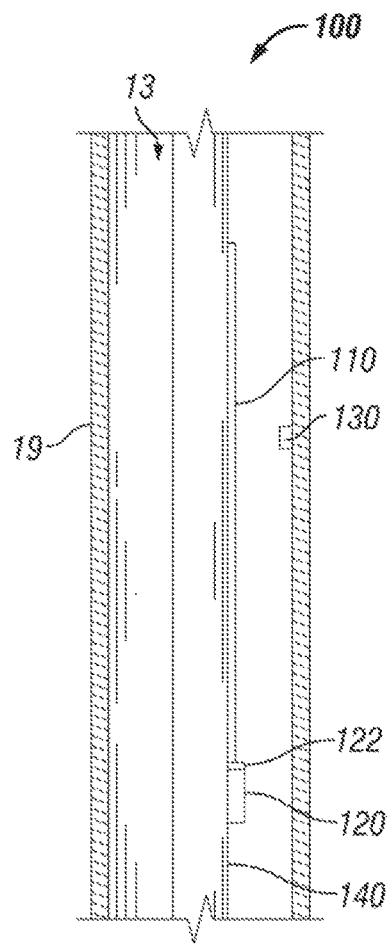
Figure 3D:
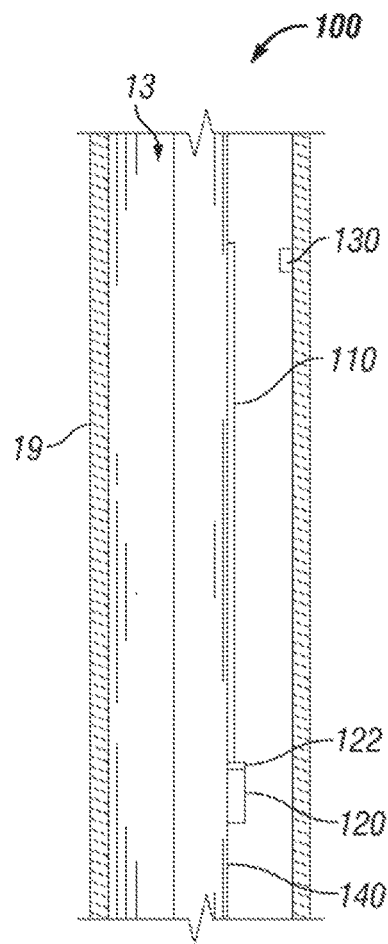
Figure 4:
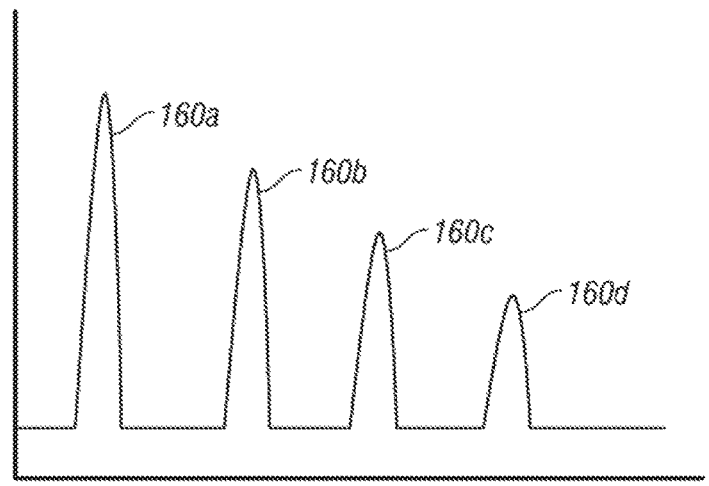
FIG. 4 is a composite graph of the amplitude of four scintillation responses at the four positions of the position determination system with respect to the radioactive tag as shown in FIGS. 3A-3D, respectively.

FIGS. 3A-3D show position determination system 100 over a period of time as conveyance 140 is run into wellbore 13 past radioactive detector 130. In FIG. 3A, first optical detector 122 has just been lowered past radioactive tag 130, and in FIG. 3D, the second end of first optical fiber 110 is proximal to radioactive tag 130. FIG. 4 is a composite graph of the amplitude of four scintillation responses 160a-160d measured by detection system 120 at first optical detector 122 at the four positions of position determination system 100 of FIGS. 3A-3D, respectively. The scintillating flashes combined with the high optical losses in optical fiber 110 for visible light may be used to determine the detection system 120 from radioactive tag 130.

When a particular section of first optical fiber 110 is in close proximity to radioactive tag 130, gamma emissions from the source will cause a scintillation event in that particular section of the fiber. Because the optical attenuation in first optical fiber 110 is high, the amplitude of the light pulse received at first optical detector 122 is inversely related to the length of the fiber between the scintillation event and the detector. Therefore, larger pulses are indicative of radioactive tag 130 being closer to first optical detector 122, while smaller amplitude pulses result when radioactive tag 130 is located farther away from the detector.

Accordingly, in FIG. 4, large-amplitude pulse 160a corresponds to FIG. 3A, where radioactive tag 130 is located near first optical detector 122 and little attenuation occurs through first optical fiber 110. Likewise, as conveyance 140 is further lowered and optical detector 122 moves farther from radioactive tag 130 (FIGS. 3B-3D), the amplitude of corresponding pulses 160b-160d received at first optical detector 122 diminish.

In some embodiments, the relationship between distance and pulse amplitude may be calibrated at surface prior to running position determination system 100 in wellbore 13. In other embodiments, an in situ calibration may be performed by moving conveyance 140 past radioactive tag 130 and recording the response. In situ calibration provides amplitudes from a minimum distance through a maximum distance between the radioactive tag 130 and first optical detector 122. Because the length of first optical fiber is known and radioactive tag 130 is stationary, a correlation between amplitude and distance can be estimated.

Figures 5A, 5B:
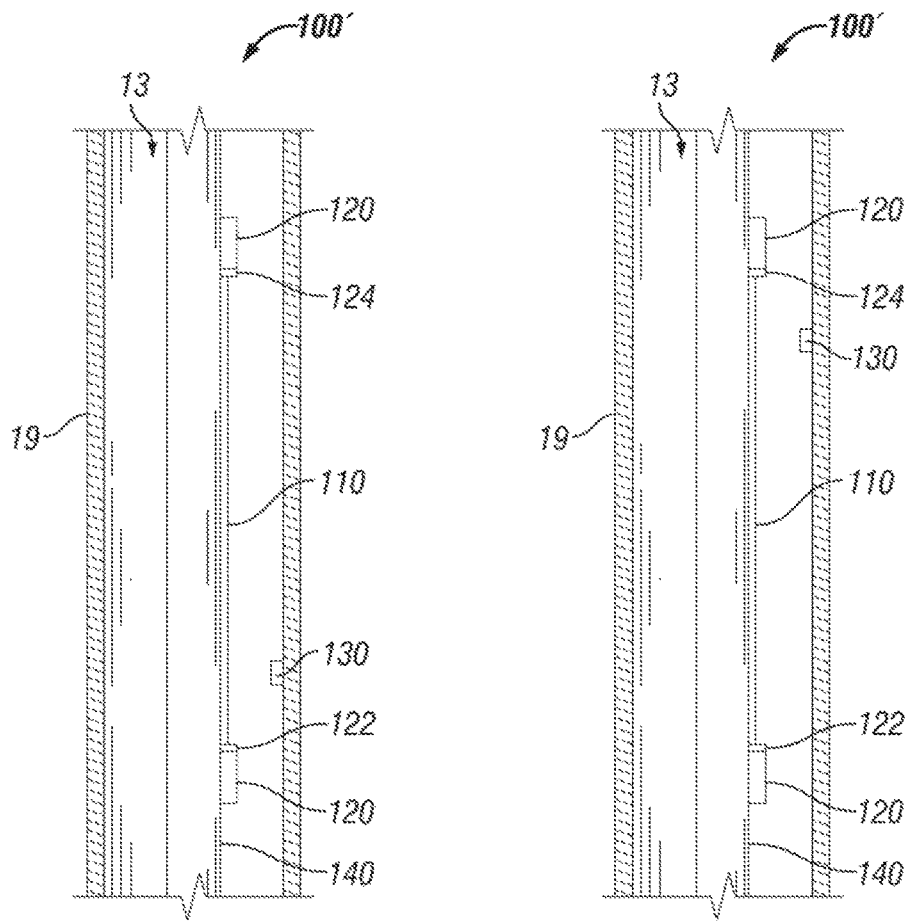
FIGS. 5A and 5B are simplified axial cross sections of a position determination system according to one or more embodiments being run within a wellbore past a radioactive tag, showing a scintillating optical fiber carried along a conveyance and coupled at both ends to first and second optical detectors.

FIGS. 5A and 5B are simplified axial cross sections of position determination system 100' according to one or more embodiments. Position determination system 100' is shown disposed with wellbore 13, which may be lined with casing 19. As with position determination system 100 of FIG. 3A, conveyance 140, which may be a wireline, coiled tubing, drill pipe, or the like carries a scintillating first optical fiber 110. The length of first optical fiber 110 may range from 10-30 meters, although any suitable length may be used. Scintillating first optical fiber 110 has a first end coupled to a first optical detector 122 of detector system 120. The second end of first optical fiber 110 is coupled to a second optical detector 124 of detector system 120. Optical detectors 122, 124 may be photomultipliers, photodiodes, or other suitable devices. Position determination system 100' may also include a radioactive tag 130, which may be located on or within casing 19, a liner, cement sheath (not illustrated), or elsewhere within wellbore 13. Radioactive tag 130 may be purposely and precisely located at a particular reference depth in wellbore 13. Radioactive tag 130 may include any suitable radioisotope, such as $^{60}$Co or $^{138}$Cs.

When a particular section of first optical fiber 110 is in close proximity to radioactive tag 130, gamma emissions from the source will cause a scintillation event in that particular section of the fiber. The resultant optical pulse will propagate both upwards and downwards in first optical fiber 110. Because the optical attenuation in first optical fiber 110 is high, the amplitude of the light pulses received at optical detector 122, 124 is inversely related to the length of the fiber between the scintillation event and the detectors. Accordingly, the difference in amplitudes between pulses from a scintillation event measured at optical detector 122, 124, respectively, is indicative of the relative position of radioactive tag 130 between optical detector 122, 124.

Figure 6A:
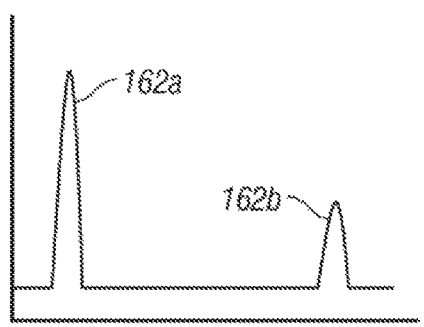
FIGS. 6A and 6B are a composite graphs of the amplitude of scintillation responses measured by the first and second optical detectors, respectively, at the two positions illustrated in FIGS. 5A and 5B.
Figure 6B:
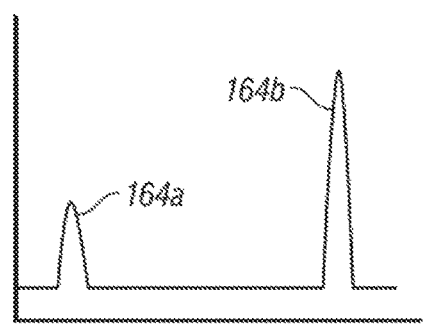

FIGS. 5A and 5B show position determination system 100' over a period of time as conveyance 140 is run into wellbore 13 past radioactive detector 130. In FIG. 5A, first optical detector 122 has just been lowered past radioactive tag 130, and in FIG. 5B, the second end of first optical fiber 110 is close to radioactive tag 130. FIG. 6A is a composite graph of the amplitude of scintillation responses 162a, 162b measured by detection system 120 at first optical detector 122 at the two positions of position determination system 100' of FIGS. 5A and 5B, respectively. In FIG. 6A, large-amplitude pulse 162a corresponds to FIG. 5A, where radioactive tag 130 is located near first optical detector 122. As conveyance 140 is further lowered and optical detector 122 moves farther from radioactive tag 130 as shown in FIG. 5B, the amplitude of pulse 162b received at first optical detector 122 diminishes. Similarly, FIG. 6B is a composite graph of the amplitude of scintillation responses 164a, 164b measured by detection system 120 at first optical detector 124 at the two positions of position determination system 100' of FIGS. 5A and 5B, respectively. small-amplitude pulse 164a corresponds to FIG. 5A, where radioactive tag 130 is located far second optical detector 124. As conveyance 140 is further lowered and optical detector 124 moves closer to radioactive tag 130 as shown in FIG. 5B, the amplitude of pulse 164b received at second optical detector 124 is greater.

Figure 7:
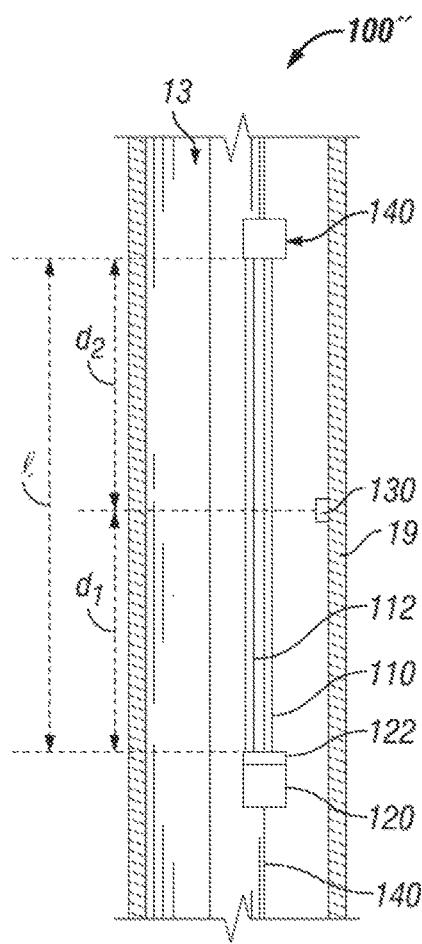
FIG. 7 is a simplified axial cross section of a position determination system according to an embodiment, showing a radioactive tag disposed within a wellbore, a scintillating optical fiber coupled to a non-scintillating optical fiber, and an optical detector carried along a conveyance.
Figure 8:
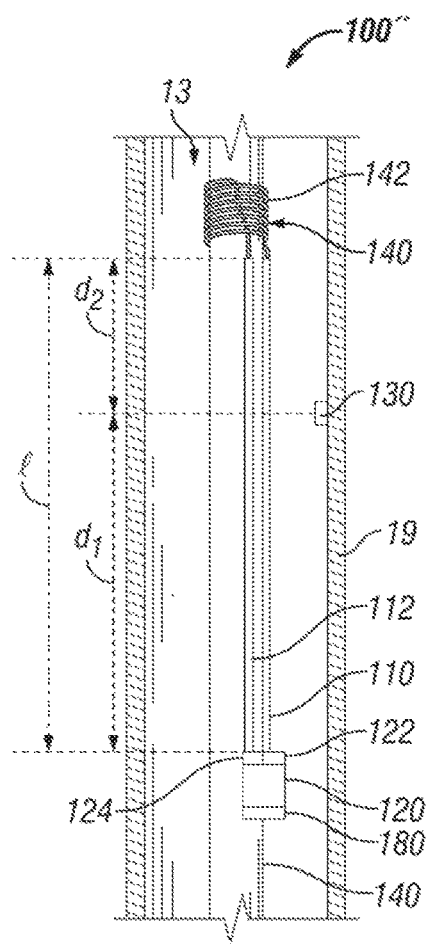
FIG. 8 is a simplified axial cross section of a position determination system according to an embodiment, showing a radioactive tag disposed within a wellbore, first and second scintillating optical fibers coupled by a fiber optic coil, and first and second optical detectors carried along a conveyance.

FIGS. 7 and 8 are simplified axial cross sections of position determination system 100" according to one or more embodiments. Position determination system 100" is shown disposed with wellbore 13, which may be lined with casing 19. As with position determination system 100 of FIG. 3A, conveyance 140, which may be a wireline, coiled tubing, drill pipe, or the like carries a scintillating first optical fiber 110. Additionally, conveyance 140 carries a second optical fiber 112 disposed generally adjacent to first optical fiber 110. Second optical fiber 112 may be a scintillating optical fiber like scintillating first optical fiber 110, or second optical fiber 112 may be a standard, non-scintillating optical fiber. The length of first and second optical fibers 110, 112 may range from 10-30 meters, although any suitable length may be used. First adjacent ends of each first and second optical fibers 110, 112 are coupled to detector system 120. The second ends of first and second optical fibers 110 are coupled together so that a scintillation pulse propagates to detector system 120 via both first and second optical fibers 110, 112. First and second optical fibers may be coupled by a coupler 140. Position determination system 100" may also include a radioactive tag 130, which may be located on or within casing 19, a liner, cement sheath (not illustrated), or elsewhere within wellbore 13. Radioactive tag 130 may be purposely and precisely located at a particular reference depth in wellbore 13. Radioactive tag 130 may include any suitable radioisotope, such as $^{60}$Co or $^{138}$Cs.

FIG. 9 is a graph of the amplitude of a scintillation response 166a, 166b measured by detection system 120 at the first ends of first and second optical fibers 110, 112 of FIG. 7. Referring to FIGS. 7 and 9, position determination system 100" includes coupler 140. Coupler 140 may but does not necessarily include a delay element. In some embodiments, coupler 140 may be a simple optical coupler that transmits light pulses between the second ends of first and second optical fibers 110, 112. In other embodiments, coupler 140 may include an electro-optical delay element, which may include one or more photo detectors, photo emitters, amplifiers, electronic delay circuits, and the like. An electro-optical delay element delay element may transmit pulses unidirectionally or bidirectionally. In the example of FIG. 7, second optical fiber is described as a non-lossy non-scintillating optical fiber, but a scintillating optical fiber may also be used. The first ends of first and second optical fibers 110, 112 are optically coupled to first optical detectors 122 of detection system 120. Although a single optical detector 122 is used to receive pulses from both first and second optical fibers 110, 112, discrete optical detectors may be used for each optical fiber as appropriate.

Unlike the embodiments of FIGS. 3A and 5A, in which amplitude of pulses is used to distinguish the position of first optical fiber 110 with respect to radioactive tag 130, position determination system 100" correlates a difference in propagation times of light pulses from a scintillation event to be received at detection system 120 via first and second optical fibers 110. The known parameters in position determination system 100" are the propagation velocity v, the length l of first and second optical fibers 110, 112, and the time delay $t_d$ of coupler 140, if any. The time $t_1$ for a scintillation pulse originating in scintillating first optical fiber 110 adjacent to radioactive tag 130 to directly reach first optical detector 122 is given by:

$$t_1 = \frac{d_1}{v} \qquad \text{Eq. 1}$$

where $d_1$ is the distance from radioactive tag 130 to first optical detector 122. The time $t_2$ for the same scintillation pulse reach second optical detector 124 via the circuitous path is given by:

$$t_2 = \frac{2d_2 + d_1}{v} + t_2 \qquad \text{Eq. 2}$$

Thus, the time difference Δt between received pulses is given by:

$$\Delta t = t_2 - t_1 = \frac{2d_2}{v} + t_d \qquad \text{Eq. 3}$$

Because the length l of each first and second optical fibers 110, 112 is equal to sum of $d_1$ and $d_2$, the distance $d_1$ of radioactive tag 130 from first optical detector 122 may be expressed as:

$$d_1 = l - \frac{v(t_d - \Delta t)}{2} \qquad \text{Eq. 4}$$

A delay element with a predetermined delay time $t_d$ in optical coupler 140 may be used to further space out the scintillation flashes to help discriminate the arrival times. In the case of no delay element, Equation 4 simplifies to:

$$d_1 = l + \frac{v\Delta t}{2} \qquad \text{Eq. 5}$$

Referring to FIG. 8, first and second scintillating optical fibers 110, 112 are provided. The second ends of optical fibers are bidirectionally optically coupled by coupler 140 formed of a coil 142 of optical fiber of length $l_d$. Coil 142 creates a delay element with a delay time $t_d$ of $l_d/v$. Coil 142 may be formed of an ordinary non-lossy optical fiber, or coil 142 may be formed of a scintillating optical fiber. In the latter case, and advantage may be provided by coil 142 creating an unmistakable scintillation event when coil 142 passes by radioactive tag 130. The first ends of first and second optical fibers 110, 112 are optically coupled to first and second optical detectors 122, 124, respectively of detection system 120. Although a two optical detectors 122, 124 are used to receive pulses from first and second optical fibers 110, 112, a single optical detector may be used for both optical fiber as appropriate. Because both first and second optical fibers 110, 112 are scintillating, each fiber is subject to a scintillation event that creates optical pulses which travels in both directions along the fibers.

FIG. 10A is a graph of the resultant pulses 168a, 168b of scintillation responses occurring in both scintillating optical fibers 110, 112 adjacent radioactive tag 130 measured at first optical detector 122 of FIG. 8. Pulse 168a results from a scintillation event in first scintillating optical fiber 110 and propagates directly to first optical detector 122 via first optical fiber 110. Pulse 168b results from a scintillation event in second scintillating optical fiber 112 and propagates circuitously to first optical detector 122 via second optical fiber 112, delay coil 142, and first optical fiber 110. Similarly, FIG. 10B is a graph of the resultant pulses 170a, 170b of the same scintillation responses occurring in both scintillating optical fibers 110, 112 adjacent radioactive tag 130, measured at second optical detector 124. Pulse 170a results from the scintillation event in second scintillating optical fiber 112 and propagates directly to second optical detector 124 via second optical fiber 112. Pulse 170b results from the scintillation event in first scintillating optical fiber 110 and propagates circuitously to second optical detector 124 via first optical fiber 110, delay coil 142, and second optical fiber 112.

Referring back to FIG. 8, detector system 120 may also include an accelerometer 180. Accelerometer 180 may be carried by conveyance 140. Accelerometer 180 may allow velocity and position to be calculated to improve accuracy of position detection system 100, 100', 100".

Position detection system 100, 100', 100" may be deployed with a wireless telemetry system to provide position information to the surface.

In one or more embodiments (not illustrated), additional scintillating optical fibers of shorter length may be included in position detection system 100, 100', 100" near detection system 120 to allow for greater precision in locating radioactive tag 130. Indeed, even small scintillating disks, buttons, or the like may be provided to provide exact position determination.

Optical detector(s) may be located in the middle of, above, or below the scintillating optical fiber(s). Locating optical detector(s) below the optical fiber(s) may be preferable as a scintillating optical fiber may be provided that is much longer than a slip joint length.

Figure 11:
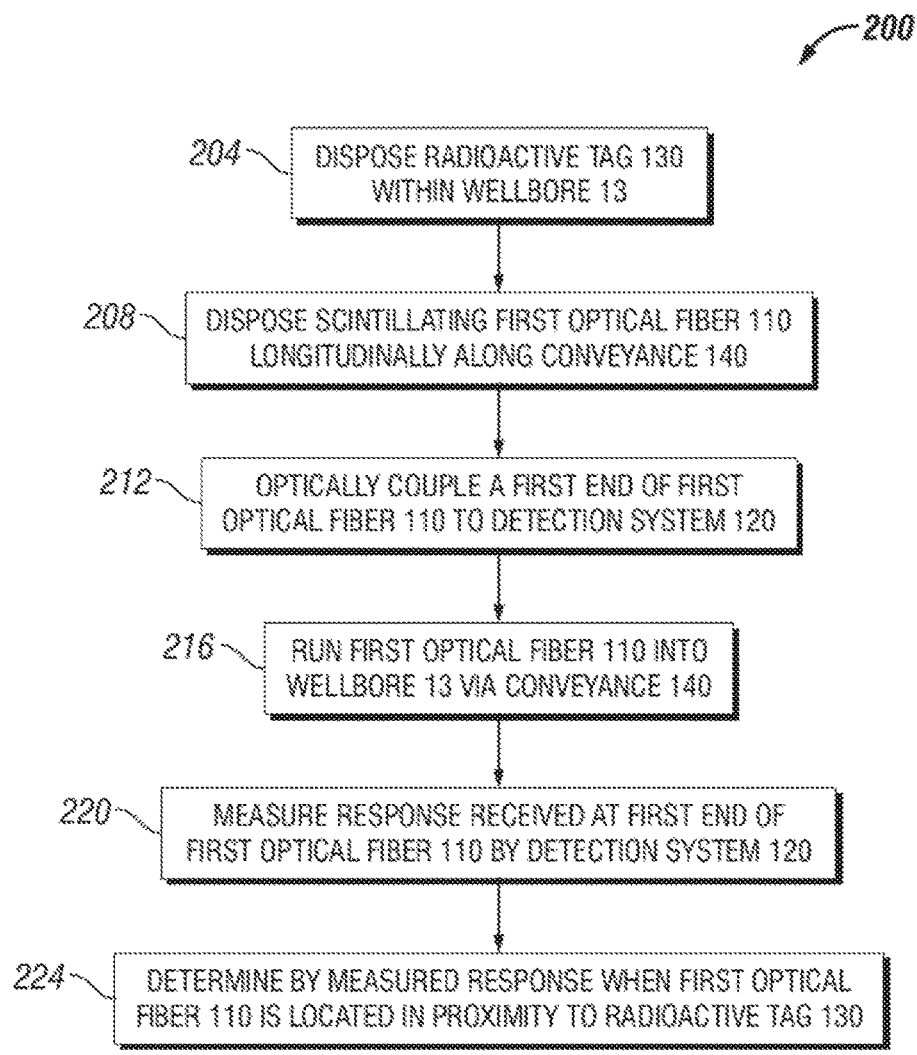
FIG. 11 is a flowchart of a method for position detection within a wellbore according to an embodiment.

FIG. 11 is a flowchart of a method 200 for position detection according to an embodiment. Referring to FIGS. 2 and 11, at step 204, radioactive tag 130 is disposed in wellbore 13. Radioactive tag 130, may be located on or within casing 19, a liner (not illustrated), cement sheath 20, or elsewhere within wellbore 13. Radioactive tag 130 may be purposely and precisely located at a particular reference depth in wellbore 13. Radioactive tag 130 may include any suitable radioisotope, such as 60Co or 138Cs. Multiple radioactive tags 130 may be disposed at varying depths within wellbore 13, depending on operational needs.

At step 208, scintillating first optical fiber 110 may be positioned longitudinally along conveyance 140. Conveyance 140 may be a wireline cable 11 (FIG. 1), coiled tubing (not expressly illustrated), drill string 32, or the like. First optical fiber 110 may be permanently affixed to conveyance 140 by any suitable arrangement, or it may be temporarily affixed to conveyance 140, such as by clamping. First optical fiber 110 may be any suitable length. For example, the length may range from 10-30 meters. Scintillating optical fiber 110 may include materials that emit short, bright flashes of visible light whenever exposed to the gamma radiation. Scintillating first optical fiber 110 may include a plastic optical fiber, such as a polymethylmethacrylate- or fluorinated polymer-cladded polystyrene core. Alternatively, scintillating first optical fiber 110 may include a higher-temperature-rated optic fiber, such as a silica- or sapphire-based fiber, encased in tubing and immersed in a scintillating fluid. Interaction between the scintillating fluid and ionizing radiation generates short, bright flashes of light, a portion of which may be optically coupled into the fiber 110.

At step 212, a first end of first optical fiber 110 may be optically coupled to detection system 120. First optical fiber 110 may be coupled to detection system 120 via a first optical detector 12, which may include a photomultiplier, photodiode, or other suitable device operable to an electrical pulse proportional to a light pulse received at the first end of first optical fiber 110. Detection system 120 and/or optical detector may be carried along conveyance 140.

At step 216, first optical fiber 110 may be run into wellbore 13 via conveyance 140. As first optical fiber 110 is being run within wellbore 13, at step 220, responses received at said first end of said first optical fiber may be measured by detection system 120. Scintillating first optical fiber emits short, bright flashes of visible light whenever exposed to the gamma radiation. At step 224, when a scintillating flash is measured, it may be determined that first optical fiber 110 is located within proximity to radioactive tag 130. As described above, the amplitude of received pulses may be used to estimate where in first optical fiber 110 scintillating events are occurring. By providing a second optical 112 fiber coupled to first optical fiber 110, a time delay between received pulses may be used to indicate where along first optical fiber 110 scintillating events are occurring.

In summary, a position determination system and a method for position detection within a wellbore have been described. Embodiments of the position determination system may generally have: A scintillating first optical fiber longitudinally disposed along a conveyance; a detector system having a first optical detector optically coupled to a first end of the first optical fiber; the detector system operable to measure a first response received at the first end of the first optical fiber to a scintillation event occurring at a scintillation point within the first optical fiber; and a radioactive tag disposed within a wellbore; whereby the detector system is operable to determine when the first optical fiber is located in proximity to the radioactive tag. Embodiments of the method for position detection within a wellbore may generally include: Disposing a radioactive tag within the wellbore; disposing a scintillating first optical fiber longitudinally along a conveyance; optically coupling a first optical detector of a detection system to a first end of the first optical fiber; running the first optical fiber into the wellbore via the conveyance; measuring a first response received at the first end of the first optical fiber to a scintillation event occurring at a scintillation point within the scintillating first optical fiber; and determining by the first response when the first optical fiber is located in proximity to the radioactive tag.

Any of the foregoing embodiments may include any one of the following elements or characteristics, alone or in combination with each other: The detector system is operable to measure an amplitude of the first response and, based on the amplitude, determine a location along the first optical fiber corresponding to the scintillation point; a second optical detector included in the detector system and optically coupled to the second end of the first optical fiber, the detector system operable to measure a second response received at the second end of the first optical fiber to the scintillation event; a difference between the first and second responses is indicative of a location along the first optical fiber that corresponds to the scintillation point; the detector system is operable to measure one of the group consisting of an amplitude difference of the first and second responses and a time difference of the first and second responses; a second optical fiber longitudinally disposed along the conveyance generally adjacent to the first optical fiber, a second end of the second optical fiber coupled to a second and of the first optical fiber; the detector system coupled to a first end of the second optical fiber, the detector system operable to measure a second response received at the first end of the second optical fiber to the scintillation event; a second optical detector included in the detector system and optically coupled to the first end of the second optical fiber; a delay element coupling the second ends of the first and second optical fibers; the delay element includes a coil of optical fiber optically coupling the second ends of the first and second optical fibers; the delay element includes a coil of scintillating optical fiber optically coupling the second ends of the first and second optical fibers; the delay element includes an electro-optical repeater; the second optical fiber is a scintillating optical fiber; the first scintillating optical fiber includes a lossy optical fiber disposed within a tube containing a scintillating fluid; the first scintillating optical fiber includes a polystyrene material; an accelerometer coupled to the conveyance and to the detector system for calculating a distance travelled by the conveyance; measuring by the detection system an amplitude of the first response; determining a location along the first optical fiber corresponding to the scintillation point based on the amplitude; optically coupling a second optical detector of the detection system to a second end of the first optical fiber; measuring by the detection system a second response received at the second end of the first optical fiber to the scintillation event; determining a location along the first optical fiber corresponding to the scintillation point based a difference between the first and second responses; measuring one of the group consisting of an amplitude difference of the first and second responses and a time difference of the first and second responses; disposing a second optical fiber longitudinally along the conveyance generally adjacent to the first optical fiber; coupling a second end of the second optical fiber to a second and of the first optical fiber; coupling the detector system to a first end of the second optical fiber; measuring by the detection system a second response received at the first end of the second optical fiber to the scintillation event; coupling a delay element between the second ends of the first and second optical fibers; delaying by the delay element the propagation of the second response; coupling a coil of scintillating optical fiber between the second ends of the first and second optical fibers; and determining by the detection system when the coil of scintillating optical fiber is in proximity to the radioactive tag.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A position determination system, comprising:
a scintillating first optical fiber longitudinally disposed along a conveyance;
a detector system having a first optical detector optically coupled to a first end of said first optical fiber; said detector system operable to measure a first response received at said first end of said first optical fiber to a scintillation event occurring at a scintillation point within said first optical fiber; and
a radioactive tag disposed within a wellbore; whereby said detector system is operable to determine when said first optical fiber is located in proximity to said radioactive tag; whereby said detector system is operable to measure an amplitude of said first response and, based on said amplitude, determine a location along said first optical fiber corresponding to said scintillation point.

2. The system of claim 1 further comprising:
a second optical detector included in said detector system and optically coupled to said second end of said first optical fiber, said detector system operable to measure a second response received at said second end of said first optical fiber to said scintillation event; whereby
a difference between said first and second responses is indicative of a location along said first optical fiber that corresponds to said scintillation point.

3. The system of claim 2 wherein:
said detector system is operable to measure one of the group consisting of an amplitude difference of said first and second responses and a time difference of said first and second responses.

4. The system of claim 1 further comprising:
a second optical fiber longitudinally disposed along said conveyance generally adjacent to said first optical fiber, a second end of said second optical fiber coupled to a second and of said first optical fiber;
said detector system coupled to a first end of said second optical fiber, said detector system operable to measure a second response received at said first end of said second optical fiber to said scintillation event; whereby
a difference between said first and second responses is indicative of a location along said first optical fiber that corresponds to said scintillation point.

5. The system of claim 4 wherein:
said detector system is operable to measure one of the group consisting of an amplitude difference of said first and second responses and a time difference of said first and second responses.

6. The system of claim 4 further comprising:
a second optical detector included in said detector system and optically coupled to said first end of said second optical fiber; or
a delay element coupling said second ends of said first and second optical fibers.

7. The system of claim 6 wherein:
said delay element includes a coil of optical fiber optically coupling said second ends of said first and second optical fibers;
said delay element includes a coil of scintillating optical fiber optically coupling said second ends of said first and second optical fibers; or
said delay element includes an electro-optical repeater.

8. The system of claim 4 wherein:
said second optical fiber is a scintillating optical fiber.

9. The system of claim 1 wherein:
said first scintillating optical fiber includes a lossy optical fiber disposed within a tube containing a scintillating fluid.

10. The system of claim 1 wherein:
said first scintillating optical fiber includes a polystyrene material.

11. The system of claim 1 further comprising:
an accelerometer coupled to said conveyance and to said detector system for calculating a distance travelled by said conveyance.

12. A method for position detection within a wellbore, comprising:
disposing a radioactive tag within said wellbore;
disposing a scintillating first optical fiber longitudinally along a conveyance;
optically coupling a first optical detector of a detection system to a first end of said first optical fiber;
running said first optical fiber into said wellbore via said conveyance;
measuring a first response received at said first end of said first optical fiber to a scintillation event occurring at a scintillation point within said scintillating first optical fiber;
measuring an amplitude of said first response;
determining by said first response when said first optical fiber is located in proximity to said radioactive tag; and
determining a location along said first optical fiber corresponding to said scintillation point based on said amplitude.

13. The method of claim 12 further comprising:
optically coupling a second optical detector of said detection system to a second end of said first optical fiber;
measuring by said detection system a second response received at said second end of said first optical fiber to said scintillation event;
determining a location along said first optical fiber corresponding to said scintillation point based a difference between said first and second responses.

14. The method of claim 13 further comprising:
measuring one of the group consisting of an amplitude difference of said first and second responses and a time difference of said first and second responses.

15. The method of claim 12 further comprising:
disposing a second optical fiber longitudinally along said conveyance generally adjacent to said first optical fiber;
coupling a second end of said second optical fiber to a second and of said first optical fiber;
coupling said detector system to a first end of said second optical fiber;
measuring by said detector system a second response received at said first end of said second optical fiber to said scintillation event; and
determining a location along said first optical fiber corresponding to said scintillation point based a difference between said first and second responses.

16. The method of claim 15 further comprising:
measuring one of the group consisting of an amplitude difference of said first and second responses and a time difference of said first and second responses.

17. The method of claim 15 further comprising:
coupling a delay element between said second ends of said first and second optical fibers; and
delaying by said delay element the propagation of said second response.

18. The method of claim 15 further comprising:
coupling a coil of scintillating optical fiber between said second ends of said first and second optical fibers; and determining by said detection system when said coil of scintillating optical fiber is in proximity to said radioactive tag.

* * * * *